Sept. 15, 1936.  H. A. S. HOWARTH  2,054,219
COMBINED THRUST AND RADIAL BEARING
Filed June 13, 1935   8 Sheets-Sheet 1

Inventor
Harry A. S. Howarth
By Cameron, Kerkam + Sutton
Attorneys

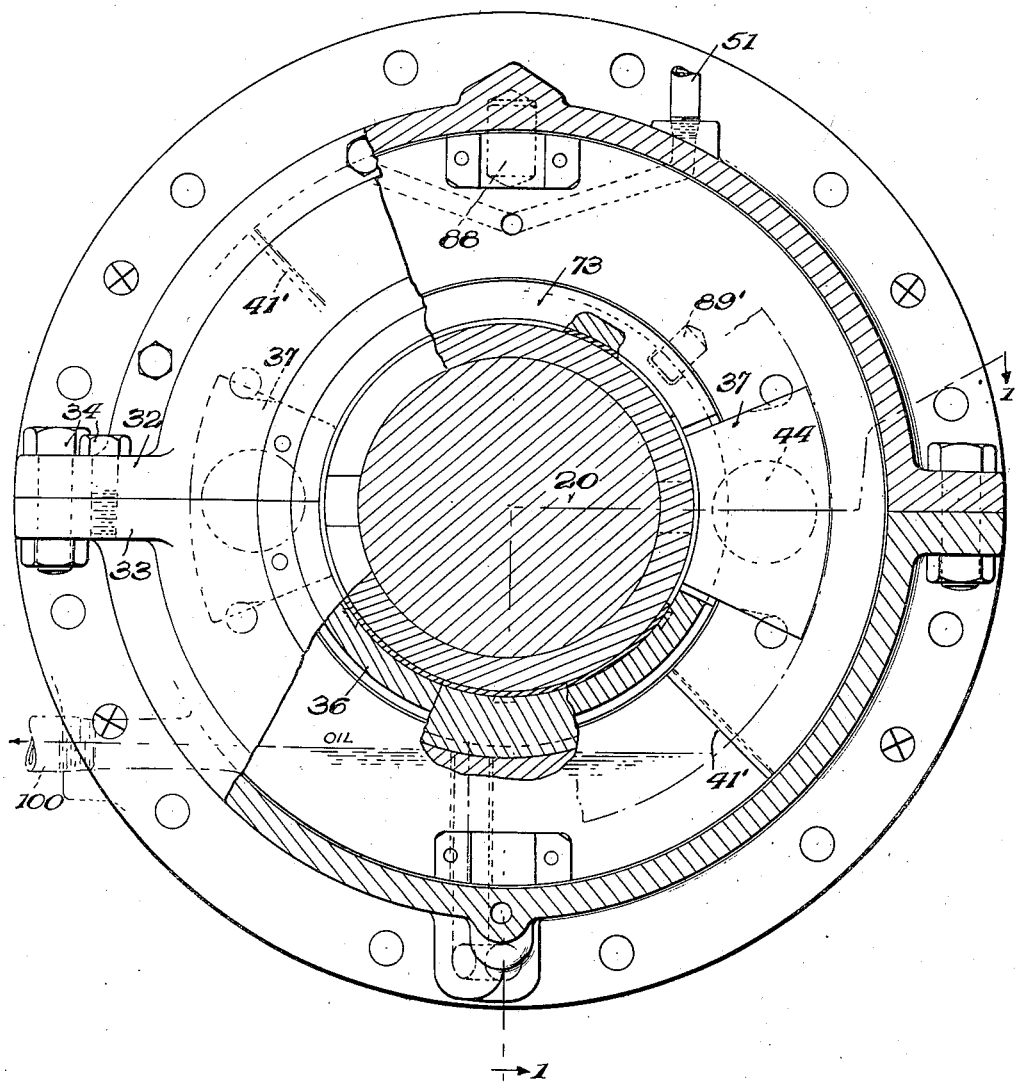

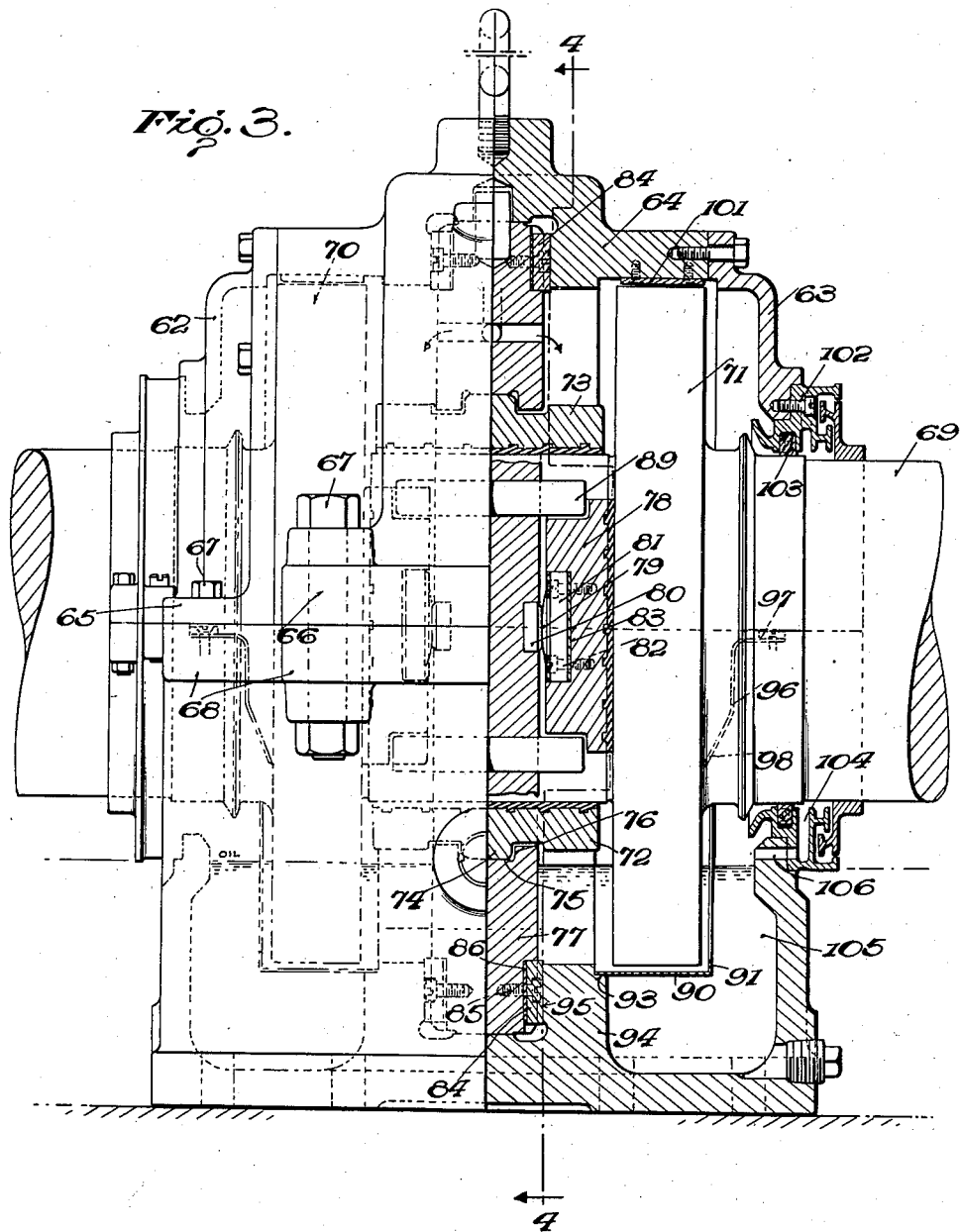

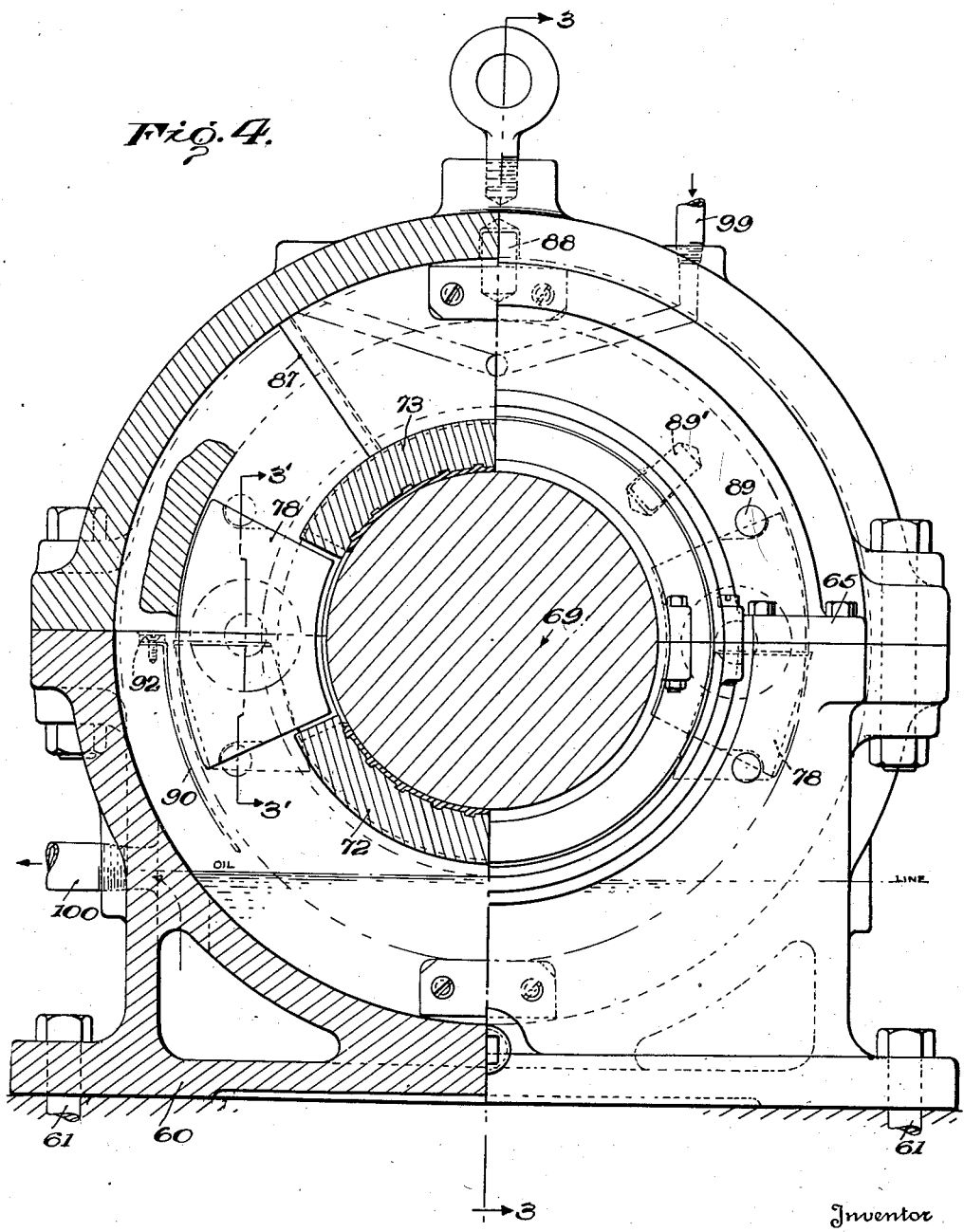

Sept. 15, 1936. H. A. S. HOWARTH 2,054,219
COMBINED THRUST AND RADIAL BEARING
Filed June 13, 1935 8 Sheets-Sheet 5
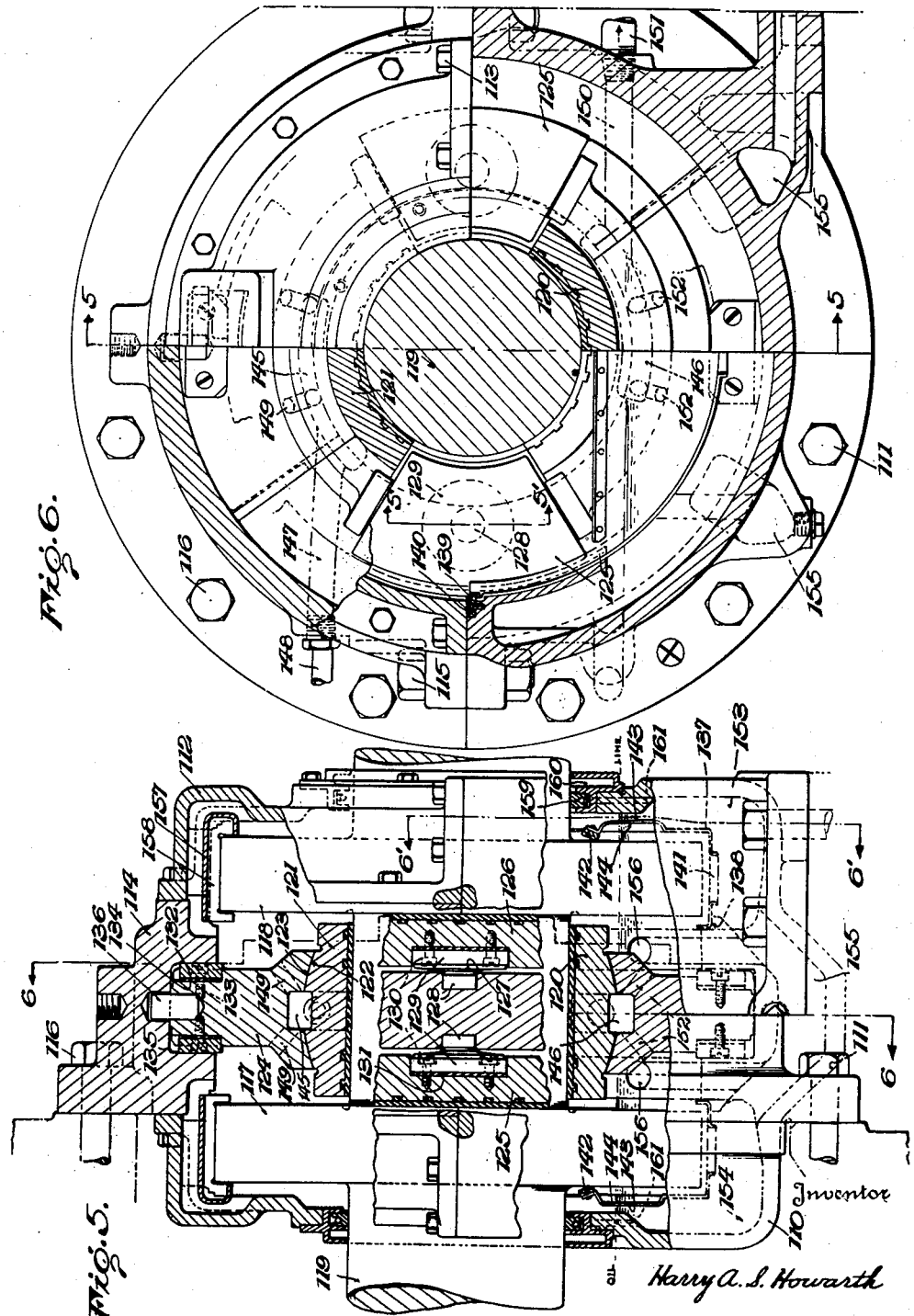

Sept. 15, 1936.  H. A. S. HOWARTH  2,054,219
COMBINED THRUST AND RADIAL BEARING
Filed June 13, 1935   8 Sheets-Sheet 6

Inventor
Harry A. S. Howarth
By
Cameron, Kerkam + Sutton  Attorneys

Sept. 15, 1936.  H. A. S. HOWARTH  2,054,219
COMBINED THRUST AND RADIAL BEARING
Filed June 13, 1935   8 Sheets-Sheet 7
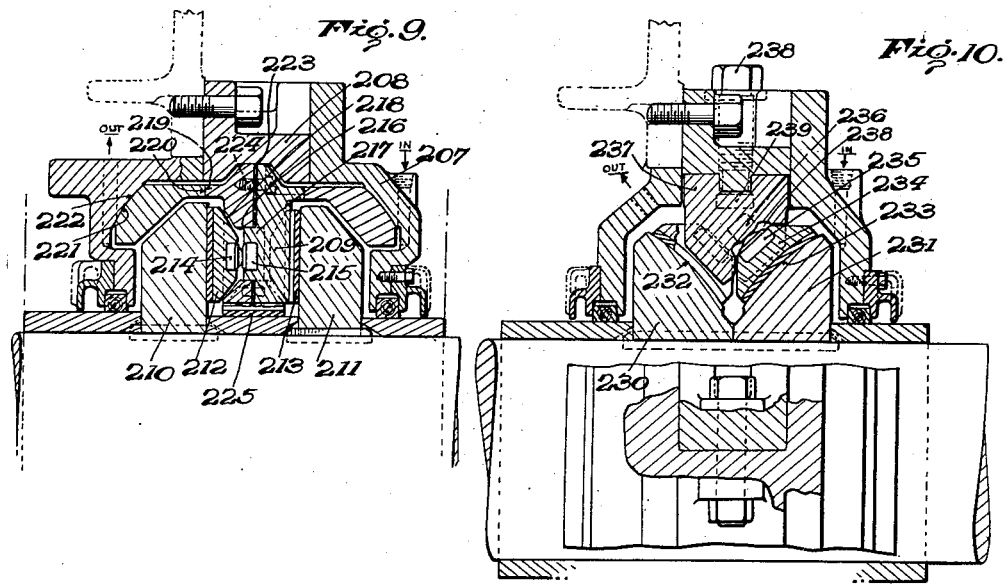
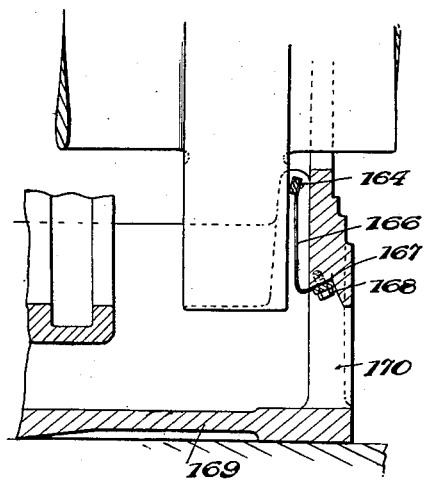
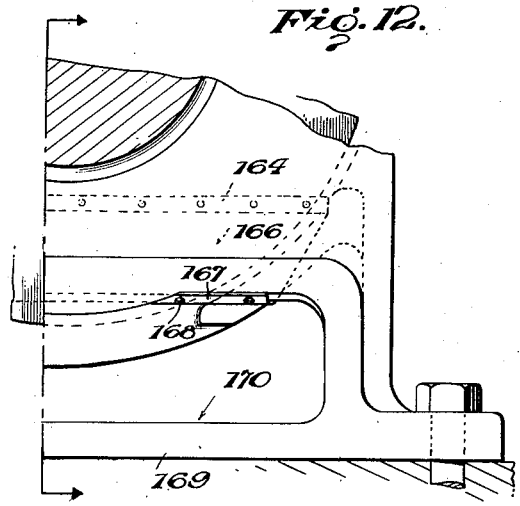
Inventor
Harry A. S. Howarth
By Cameron, Kerkam + Sutton  Attorneys Sept. 15, 1936.  H. A. S. HOWARTH  2,054,219
COMBINED THRUST AND RADIAL BEARING
Filed June 13, 1935  8 Sheets-Sheet 8
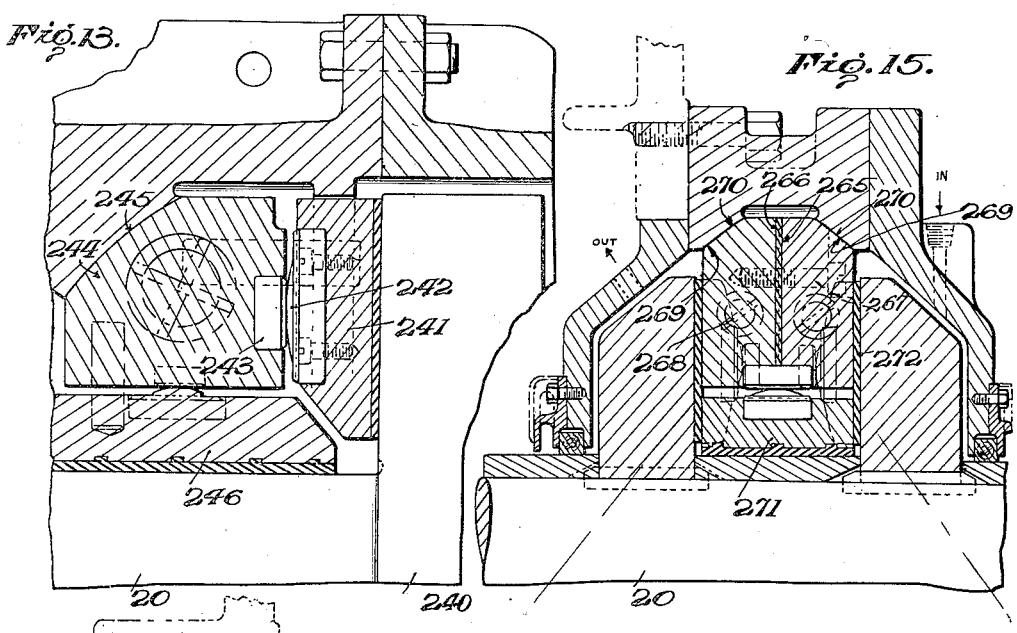
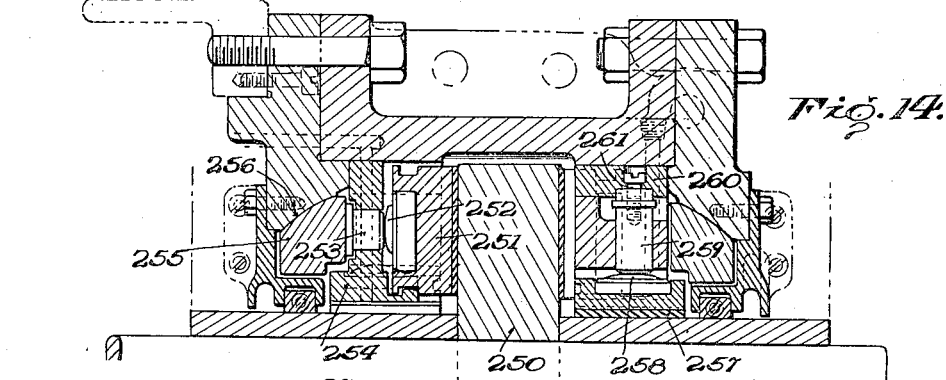
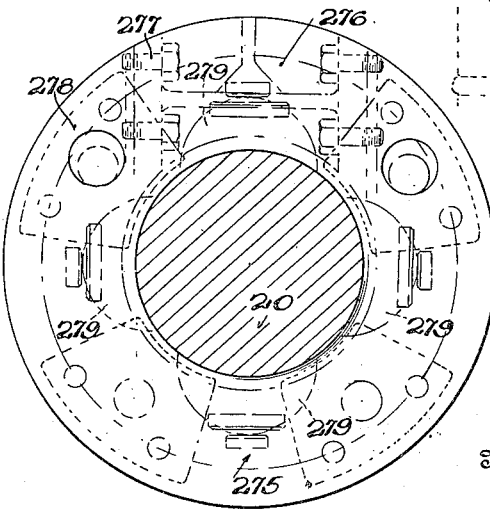
Inventor
Harry A. S. Howarth
By Cameron, Kerkam & Sutton
Attorneys Patented Sept. 15, 1936

2,054,219

UNITED STATES PATENT OFFICE 2,054,219

COMBINED THRUST AND RADIAL BEARING

Harry A. S. Howarth, Philadelphia, Pa., assignor to Kingsbury Machine Works, Inc., Philadelphia, Pa., a corporation of Delaware Application June 13, 1935, Serial No. 26,481

40 Claims. (Cl. 308—160)

This invention relates to bearings, and more particularly to combined thrust and radial bearings which are so constructed as to occupy a relatively narrow space lengthwise of the shaft.

It is an object of this invention to provide a bearing of the type characterized which employs radial and thrust bearing elements of the surface type, as distinguished from ball or roller bearings, and which provides adequate bearing surfaces for both the radial and the thrust bearings by means of a compact construction which requires a minimum space axially of the shaft.

Another object of this invention is to provide a device of the type characterized wherein the parts of the combined bearing are readily accessible from a radial direction and also readily removable radially within the relatively narrow space lengthwise of the shaft which sometimes is alone available.

Another object of this invention is to provide a device of the type last characterized wherein the parts are also readily accessible axially of the shaft.

Another object of this invention is to provide a device of the type first characterized wherein adequate provision is made for the equalization of the thrust pressure on the thrust bearing elements.

Another object of this invention is to provide a device of the type above characterized wherein the radial bearing elements are also so mounted as to provide for proper self-alignment with the shaft.

Another object of this invention is to provide a device of the type above characterized which may readily contain provision for adjusting the bearing elements so as to predetermine the clearance or end play between the elements of the bearing.

Another object of this invention is to provide a device of the type first characterized which includes adequate provision for the copious lubrication of both the radial and the thrust bearing elements and which provision for lubrication may include either or both pressure lubrication and automatic or self-lubrication, the inclusion of the latter being desirable even though pressure lubrication is provided in the event that it shall cease to function for any reason.

Another object of this invention is to provide a device of the type last characterized which contains adequate provision to prevent escape of oil along the shaft notwithstanding the use of the thrust collar to provide a copious flow of oil to the bearing elements above the level of the shaft.

Another object of this invention is to provide a device of the type first characterized which may be used within the confines of the space heretofore utilized by ball and roller bearings when employed to provide a combined radial and thrust bearing within a relatively narrow space lengthwise of the shaft.

Another object of this invention is to provide a combined radial and thrust bearing of the surface type wherein the radial and axial bearing elements are so related that the entire combined bearing may be installed in the relatively narrow space existing between a pair of contiguous thrust collars.

Another object of this invention is to provide a device of the type last characterized wherein the parts of the combined bearing are readily accessible and removable in a radial direction for inspection or repair.

Another object of this invention is to provide a device of the type last characterized which includes provision for self-alignment of the radial bearing elements and for equalizing the pressure on the thrust bearing elements, and which also affords adequate lubrication for all of the bearing elements, and wherein provision may also be made for adjustment of the bearing elements.

Another object of this invention is to provide an improved and simplified compact structure of combined thrust and radial bearing.

Another object of this invention is to provide improved lubricating means for a bearing of the type last characterized which may employ either pressure lubrication, or automatic or self-lubrication, or both.

Another object of this invention is to provide a bearing of the type characterized which is simple and compact in construction, relatively inexpensive to manufacture and assemble, easy to standardize, readily accessible both radially and axially for inspection and repair, and highly efficient in operation.

Other objects of this invention will appear as the description thereof proceeds.

The invention is capable of receiving a variety of mechanical expressions some of which are illustrated on the accompanying drawings, but it is to be expressly understood that the drawings are for purposes of illustration only and not to be construed as a definition of the limits of the invention, reference being had to the appended claims for that purpose.

Referring in detail to the drawings, wherein the same reference characters are employed to designate corresponding parts in the several figures, Fig. 1 is an axial section of an embodiment of the invention on the line 1—1 of Fig. 2;

Fig. 2 is an end view, partly in section, of the embodiment of Fig. 1;

Fig. 3 is partly an elevation and partly a section on the lines 3—3 and 3'—3' of Fig. 4 of another embodiment of the invention;

Fig. 4 is a half end elevation and a half section on the line 4—4 of Fig. 3;

Fig. 5 is an axial section of another embodiment, partly taken on line 5—5 and partly taken on line 5'—5' of Fig. 6;

Fig. 6 is a transverse section partly taken on line 6—6 and partly taken on line 6'—6' of Fig. 5;

Figs. 9 and 10 are fragmentary axial sections of yet other embodiments of the present invention;

Fig. 11 is an axial fragment and Fig. 12 a radial fragment illustrating a different form of oil scraper that may be used in the present invention;

Figs. 13, 14 and 15 are axial fragments of other embodiments of the present invention; and Fig. 16 is a diagrammatic view illustrating an alternative form of equalizing and supporting disk that may be employed in embodiments of the present invention.

Figs. 5 to 16 inclusive are to smaller scales than Figs. 1 to 4.

The present invention is designed to provide a combined radial and thrust bearing of the surface type for use where only a relatively narrow space axially of the shaft is available for the installation of the bearing parts and where heretofore it has been customary to employ ball or roller bearings. By the present invention a combined thrust and radial bearing of the surface type may be installed in a relatively narrow space axially of the shaft while, at the same time, increased facility of access to and removal of the bearing parts, for inspection or repair, is provided. The combined bearing so provided may be installed in a housing of either the pedestal type, or the flange type, as may be preferred, both forms being illustrated on the drawings and, therefore, it is to be expressly understood that throughout the following discussion the bearing housing may be made to take either of the foregoing types, as preferred, irrespective of the particular illustration under consideration.

Figure 1:
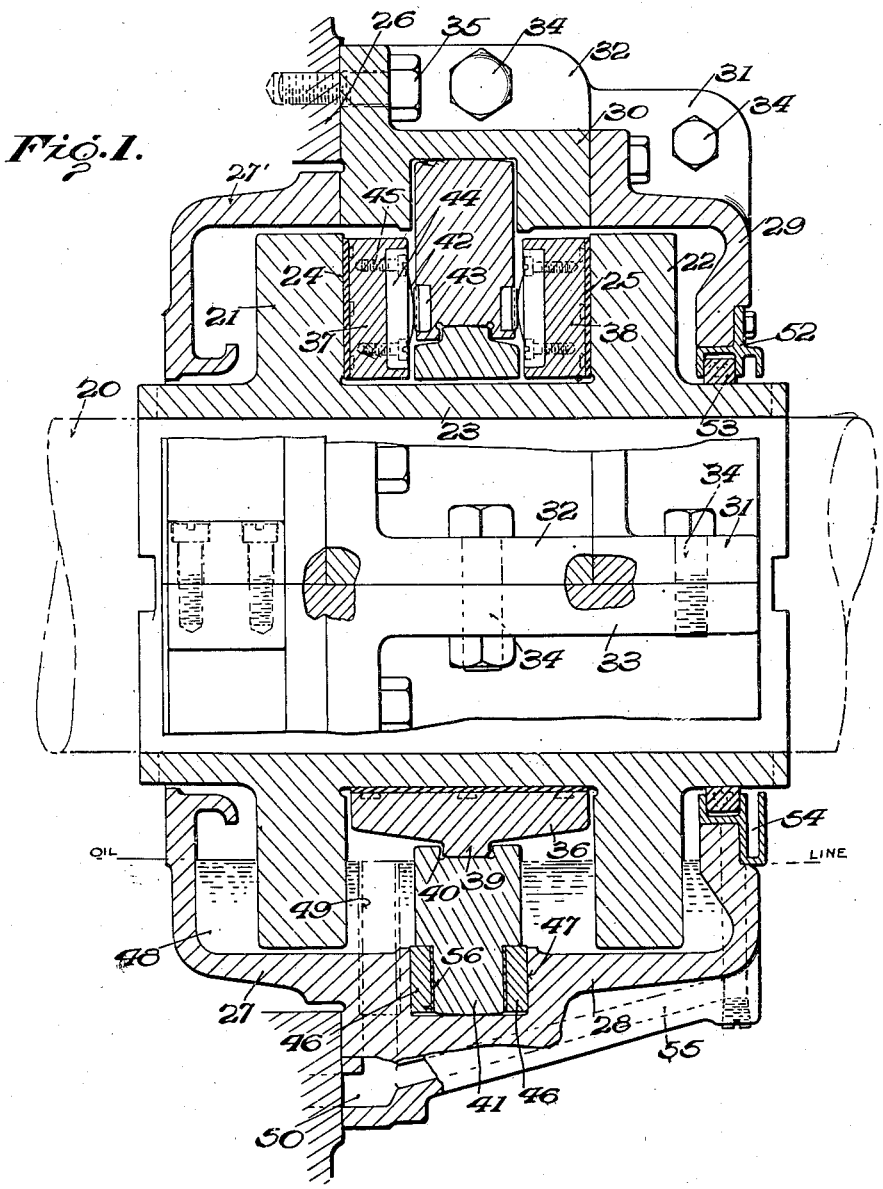
Figure 7:
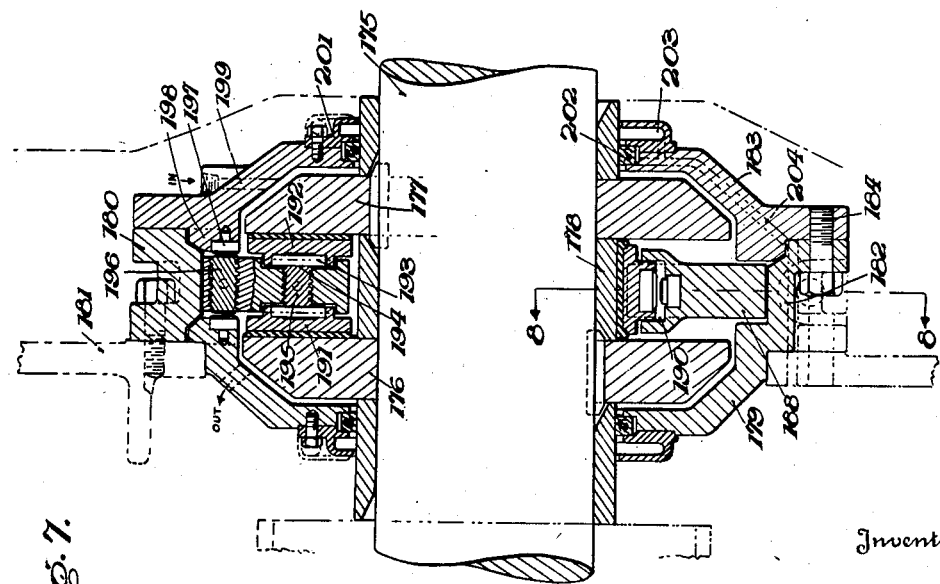
Fig. 7 is an axial section, partly on line 7—7 and partly on line 7'—7' of Fig. 8, of another embodiment of the present invention.

Referring first to Figs. 1 and 2, which show a bearing housing designed to be bolted to a machine frame, the shaft 20, which may be any suitable shaft, as for example the shaft of a marine engine, is shown as provided with a pair of thrust collars 21 and 22 which may be separately keyed to or formed integrally with the shaft 20, or attached to or formed integrally with a sleeve 23 secured to the shaft in any suitable way. Interposed between the inner faces 24 and 25 of said thrust collars is the combined radial and thrust bearing of the present invention. The machine frame is indicated at 26, and the housing for the thrust collars and the combined radial and thrust bearing is shown as composed of four parts. The main housing portion 27, which includes an upper part 27' suitably attached to the lower part as by bolts or screws as shown, embraces the shaft and the inner collar 21 and has, here shown as formed integrally therewith, a semicircular portion 28 projecting outwardly therefrom and embracing the lower 180° of the outer collar 22 and the combined radial and thrust bearing to be described. Said main housing portion 27 may be attached to the machine frame in any suitable way, as by bolts or screws as shown in Fig. 2. The upper 180° of the housing in radial alignment with the aforesaid portion 28 is composed of two semicircular sections 29 and 30 which are flanged at their ends as shown at 31 and 32 and suitably attached to flanges 33 on said portion 28, as by bolts or screws 34. If preferred, however, portion 29 may constitute a complete annulus, and portion 28 may terminate in the plane at right angles to the axis of the shaft which contains the surface of contact between the portions 29 and 30, as shown in Fig. 7, if it is desired that the end cover of the housing be removable only axially of the shaft. The construction as illustrated, however, has the advantage that no joint for oil leakage is left in the lower 180° of the housing, and access may be gained to the interior of the housing by removing the upper 180° cover portions 29 and 30 when the bolts or screws 34 are removed.

Inasmuch as the combined radial and thrust bearing is confined between the inner faces of the thrust collars 21 and 22, radial accessibility to the bearing elements is possible only through the relatively narrow space axially of the shaft defined between the collar faces 24 and 25. Therefore, the width between the line of junction between the cover portion 30 and the machine frame 26 and the main housing 27, at the inner end, and between said cover portion 30 and the cover portion 29, at the outer end, is shown as made substantially equal to the axial distance between the faces 24 and 25 of the thrust collars 21 and 22. Thus, by removal of the bolts or screws 34 and one or more bolts or screws 35 which may be used if desired to attach the cover portion 30 to the machine frame, and lifting the cover member 30, the combined radial and thrust bearing next to be described is accessible and may be withdrawn radially outward through the opening thus provided when, as here, it is composed of parts facilitating such removal.

The combined radial and thrust bearing of the present invention is composed of compactly arranged thrust and radial bearing elements having a common supporting means and disposed relatively one within the other concentrically. As illustrated, the radial bearing is composed of top and bottom bearing shells 36, each of which extends for approximately 120° of the circumference of the shaft and which are preferably symmetrically disposed with respect to a vertical plane containing the axis of the shaft, although if preferred tiltably mounted radial bearing shoes may be employed as in other embodiments to be described. The thrust bearing is composed of two pairs of thrust bearing shoes 37 and 38 of any suitable construction, one pair cooperating with the inner face of collar 21 and the other pair cooperating with the inner face of collar 22, the shoes of each pair being disposed between the circumferential extremities of the upper and lower bearing shells as shown in Fig. 2.

The bearing shells 36 have radial bearing engagement with the peripheral surface of the sleeve 23, or with the surface of the shaft if the thrust collars are keyed directly to or formed integrally with the shaft, and are provided midway between their axial extremities with a circumferentially directed rib 39 which may have a cylindrical peripheral surface or which may have a transversely convex peripheral surface so as to facilitate rocking of said shells axially of the shaft. Said ribs 39 engage a cylindrical or transversely concave surface provided at the bottom of a groove 40 formed in a split supporting disk 41 shown as having peripheral contact with the housing portions 28 and 30. Said disk is split radially on a plane where said disk is subject to shearing stresses only, and shown as making approximately 45° to the horizontal at 41' in Fig. 2, and the parts are secured together in any suitable way.

Mounted on said supporting disk 41 at opposite sides of the shaft and preferably symmetrically with respect to a horizontal axial plane containing the axis of the shaft, are said two pairs of shoes 37 and 38 in axially opposed relationship. Said shoes may be mounted in any suitable way, each shoe being shown as provided with a spherical rear surface 42 which makes engagement with a hardened insert 43 set into said supporting disk 41 whereby the shoe is pivotally mounted to tilt both axially and circumferentially of the collar, as is characteristic of Kingsbury bearings. In the form shown the spherical surfaces 42 are provided on blocks 44 received in recesses in the backs of the shoes and suitably retained therein as by screws 45, to the end that shims may be interposed between said blocks and shoes and thereby the axial distance between the faces of the shoes and the faces of the supporting disks 43 may be adjusted to obtain a predetermined clearance or end play between the thrust bearings parts.

The supporting disk 41 is also preferably so constructed or mounted as to provide an equalizing mounting for said shoes 37 and 38, and as only two shoes are employed for each direction of thrust, said disk is shown as mounted to tilt with respect to an axis at right angles to a line joining the pivotal centers of the shoes of each pair. To this end the supporting disk 41 carries in each face at its top and bottom a pair of pivot blocks 46 having pivotal engagement with the opposed faces of a channel 47 formed in the housing portions 28 and 30. As the pivot blocks of each pair engage the housing symmetrically with respect to a vertical plane containing the axis of the shaft, while the shoes of each pair are disposed symmetrically with respect to a horizontal plane containing the axis of the shaft, the supporting disk 41 will tilt about the vertical axis provided by the pivot blocks 46, at one or the other face of the supporting disk 41 depending upon the direction of thrust, to substantially balance the pressure on the pair of thrust bearing elements that are active for that direction of thrust.

Inasmuch as only two shoes are used for cooperation with each thrust collar, the bearing is self-lubricating where, as here, each thrust collar dips into a body of oil 48 provided in the lower half of the bearing housing, the level of the oil therein being suitably determined as by an overflow pipe 49 which communicates with suitable passages 50 for leading the oil from the housing. Oil may be supplied to the housing in any suitable way, as by a pipe communicating with the interior thereof, preferably adjacent the top thereof as shown at 51, so that the radial bearing surfaces above as well as below the axis of the shaft are copiously lubricated. In order to prevent escape of oil along the shaft, an oil retaining ring 52 is preferably attached to the outer extremity of the housing and has rubbing contact with the periphery of the sleeve 23 at 53. Exteriorly of said area of rubbing contact the oil retaining ring is provided with an oil collecting channel 54 from which the oil may be returned to the main oil flow or lead to an exterior sump through a passage or passages 55.

In a bearing constructed as heretofore described access may be readily gained to all of the bearing parts when the cover portion 30 has been removed, as the supporting ring 41 may be rotated until the shoes 37 and 38 are in a position to be lifted out of the opening thus provided, after which the halves of the supporting ring 41 may be disconnected and removed together with the radial bearing shells. Hence the combined radial and thrust bearing is readily accessible for inspection, renewal of parts, etc., and at the same time it occupies a relatively narrow space axially of the shaft because the thrust and radial bearing elements are arranged in relative concentricity with respect to each other although in staggered relationship; the radial and thrust bearing elements in this embodiment forming spacing members for each other so that together they form a complete circular series around the shaft. Not only are the bearing shoes mounted so that they may tilt both circumferentially and axially of the shaft to properly position themselves with respect to the opposed surfaces of the thrust collars, but the radial bearing shells are tiltably mounted so that they are also self-aligning, and at the same time the bearing shoes are mounted so that the pressure thereon is equalized by the action of the supporting or equalizing disk 41, the equalizing action of the latter not interfering with the self-aligning action of the radial bearing elements. Moreover, provision is made for adjusting the axial clearances by means of the shims that may be introduced between each shoe and its supporting block, and if necessary shims may also be interposed between the supporting disk 41 and the pivot blocks 46 as shown at 56 so as to properly delimit the end play between the supporting disk and the bearing housing.

Referring now to the embodiment of Figs. 3 and 4 a somewhat similar construction is illustrated in conjunction with a pedestal type of bearing. As here shown, the housing 60 is composed of a lower section of approximately 180° which may be attached to any suitable foundation as by bolts or screws 61. The upper half of the housing is formed in three sections, end cover members 62 and 63 and an intermediate semicircular cover portion 64 all of which are suitably flanged at their ends as shown at 65 and 66 for attachment, as by bolts or screws 67, to the flanges 68 upon the lower half of the housing. The shaft 69 is here shown as provided with a pair of collars 70 and 71 integral therewith, although separate collars keyed thereto, or collars attached to or integral with a sleeve as in Figs. 1 and 2, may be employed if preferred. In this embodiment the cover 64 is shown as having an axial dimension wider than the distance between the inner faces of the thrust collars 70 and 71 so as to provide ready access to the oil scrapers and the half rings disposed around the lower portions of the thrust collars to prevent excessive disturbance of the oil in the well under the action of the rotating thrust collars thereon.

Mounted between the inner faces of the thrust collars 70 and 71 is a combined radial and thrust bearing of the same general character as heretofore described in conjunction with Figs. 1 and 2. The radial bearing is composed of a pair of radial bearing shells 72 and 73, each approximately 120° of circumferential extent and having bearing contact with the periphery of the shaft, but as before noted pivotally mounted shoes that tilt in a circumferential direction may be used if desired. Each of said bearing shells has a circumferential rib 74 midway of its axial length and provided with a flat or axially convex surface for rocking contact with the surface 75 provided at the bottom of a groove 76 formed in a supporting disk 77. Thereby said bearing shells may tilt axially and are self-aligning. The thrust bearing is composed of two pairs of thrust bearing elements of any suitable construction, shown as tiltable shoes 78, one pair for cooperation with collar 71 and one pair for cooperation with collar 70, each pair of shoes being disposed at opposite sides of the shaft and preferably symmetrically with respect to a horizontal plane containing the axis of the shaft. Each shoe is provided at its rear face with a spherical surface 79 which has rocking contact on a hardened insert 80 carried by the supporting disk 77. As shown, each spherical surface 79 is provided on a block 81 received in a recess at the rear of the shoe and properly retained therein as by screws 82 to provide for the interposition of shims 83 as heretofore explained. Supporting disk 77 is provided at its top and bottom with opposed pivot blocks 84, here shown as suitably secured to the disk 77 by screws 85 with interposed shims 86 for the purpose heretofore explained. The upper and lower pivot blocks 84 at each side of the disk 77 provide a pivotal axis for the disk 77 on the line extending at right angles to the line joining the centers of the bearing shoes, so that said disk 77 constitutes an equalizing disk for balancing the pressure on the active pair of shoes as heretofore explained. Disk 77 is split on the plane indicated by the line 87 as heretofore explained, with the parts secured together in any suitable way and rotation thereof with respect to the housing may be prevented by the use of a dowel pin 88. Said disk 77 is also shown as provided with elongated dowel pins 89 which extend through said disk to the opposite sides thereof and at their extremities engage in notches in the rear of opposed shoes 78 to properly locate said shoes and prevent displacement thereof. Dowels for the radial bearing elements may also be provided as indicated at 89' in Fig. 4.

In the embodiment of Figs. 3 and 4 half rings 90 having inwardly directed flanges 91 are suitably mounted in the lower half of the bearing housing, as by clips 92, and closely surround the lower half of each thrust collar so as to reduce the body of oil directly acted upon by the rotating thrust collar. Said half rings are preferably formed of sheet metal and are shown as engaging shoulders 93 formed in the outer sides of the ribs 94 which provide the channel 95 in which is received the supporting and equalizing disk 77 with its pivot blocks 84. Said half rings may be rolled into the recess provided at said shoulders if desired. To reduce the quantity of oil carried upwardly to the upper half of the bearing by the inactive faces of the thrust collars, and thereby decrease the danger of flooding the recesses at the rear of the thrust collars, an oil scraper of any suitable character is preferably provided for coaction with the rear face of each thrust collar. As shown, there is an oil scraper for each direction of rotation cooperating with the rear face of each thrust collar, each scraper being in the form of a plate 96 suitably secured to the housing, as at 97, and having a flexible end 98 that provides a scraping edge extending across the rear face of the thrust collar (see Fig. 3) to scrape the oil therefrom.

Oil may be supplied to the space between the thrust collars in any suitable way as by the inlet pipe 99 and removed therefrom by a suitable overflow pipe such as shown at 100. Here again as only two shoes coact with a face of each thrust collar the bearing is self-lubricating, but if preferred an oil scraper 101 may be provided for coaction with the periphery of each thrust collar and so constructed and disposed as to deflect the oil carried upwardly by the periphery of the thrust collars into the space between the thrust collars so that a copious supply of lubricant is always provided for the bearing shells 73. As in the embodiment of Figs. 1 and 2 an oil collecting ring 102 is suitably mounted at the outer face of the housing and includes a split ring 103 having a slight clearance with the shaft and movable in its recess in the ring 102 so that it may float radially with the shaft. An oil collecting channel 104 is provided exteriorly of said rubbing contact and the oil collected therein may be returned to the body of oil 105 in the base of the housing as by a passage 106. It will be perceived that a bearing constructed in accordance with Figs. 3 and 4 possesses all of the advantages heretofore discussed in conjunction with the embodiment of Figs. 1 and 2.

Referring next to the embodiments of Figs. 5 and 6, the construction here illustrated may be incorporated in either a pedestal bearing as shown in the lower right-hand portions of Figs. 5 and 6 or in a flanged housing as indicated in the remainder of Figs. 5 and 6. In either event the construction within the housing will be substantially the same. Considering the flanged housing construction as shown in the major part of Fig. 5 and in Fig. 6:—

The housing 110 is or may be composed of parts comparable with parts heretofore described in conjunction with the embodiment of Figs. 1 and 2, and comprising the inner annular portion provided with an outwardly projecting integral lower portion of substantially 180° extent and attached to the machine frame in any suitable way as by bolts or screws 111, an outer cover 112 of substantially 180° extent attached to the flange of the lower portion as by bolts or screws 113, and an intermediate cover 114 of substantially 180° extent which may also be attached to the flange of the lower portion as by bolts or screws 115, the latter cover member also being shown as secured to the machine frame by one or more bolts or screws 116. As here shown, the intermediate cover member is slightly broader than the dimension between the inner faces of the thrust collars 117 and 118, but if preferred the intermediate cover section may be of greater width as in the embodiment of Figs. 3 and 4, in which case a separate removable cover may be provided for closing an aperture at the top thereof to facilitate access to the oil scrapers when access is not desired to the entire bearing. In this embodiment the thrust collars 117 and 118 are shown as integral with the shaft 119, but if preferred the thrust collars may be keyed thereon or mounted on or formed integrally with a sleeve as heretofore described.

As in the embodiments heretofore described, the radial bearing is composed of a pair of shells 120 and 121, each of substantially 120° circumferential extent and disposed at the top and bottom of the shaft, said shells having bearing contact with the peripheral surface of the shaft. As here shown, said shells are provided at their backs with transversely convex surfaces 122 which engage correspondingly concave surfaces 123 in the inner periphery of a split supporting disk 124. Mounted on said supporting disk for cooperation with the opposed inner faces of the thrust collars 117 and 118 are two pairs of thrust bearing shoes 125 and 126 of any suitable character and construction, each pair of shoes being shown as disposed substantially symmetrically with respect to a horizontal plane containing the axis of the shaft, as in the embodiments heretofore described. As shown each of said shoes is provided with a spherical rear surface 127 mounted on a hardened insert 128 carried by the supporting disk 124, whereby said shoes may tilt both radially and circumferentially of the bearing. As shown said spherical surfaces 127 are carried by blocks 129 secured in recesses in the rears of the shoes, as by screws 130, and providing for the interposition of shims 131 as heretofore discussed in detail. Supporting disk 124 is mounted to tilt about an axis at right angles to the line joining the pivotal centers of each pair of shoes, and to this end is provided at its top and bottom with opposed pivot blocks 132 secured in position as by screws 133 so as to provide for the interposition of shims 134 as heretofore described in detail, said pivot blocks cooperating with the faces of a channel 135 formed in the bearing housing. Rotation between the disk 124 and said housing is prevented by a dowel pin 136. Thereby as in embodiments heretofore described the radial bearing members 120 and 121 may have automatic self-aligning movement with respect to the supporting disk 124, while the latter provides a pivotal support for the bearing shoes 125 and 126, and at the same time is movable about the vertical axis defined by the pivot blocks 132 so as to balance the pressure on the active pair of shoes.

In this embodiment each thrust collar is surrounded in the lower half of the bearing by a half ring 137 which may be formed of sheet metal and which as shown is of generally channel shaped cross section. Said ring may be rolled into a recess 138 provided for its inner edge and retained in position by one or more clips 139 (see Fig. 6) secured to the housing as by screws 140. The opposite extremity of the half ring may be similarly secured by clips, or it may merely abut against a stop suitably provided on the housing. Adjacent the bottom of said half ring an opening 141 is provided so that oil may flow therethrough between the spaces inside and outside of the ring. In this embodiment each half ring carries an oil scraper for cooperation with the rear face of the thrust collar so as to prevent undue quantities of oil being carried to the top of the bearing at the rear or inactive face of the thrust collar. As here shown each scraper 142 extends across a chord at the rear face of the thrust collar just below the shaft and is carried by a segmental flexible member 143 which may be suitably secured to the half ring, as by brazing or soldering. Said segmental member 143, as shown in Fig. 5, is deflected outwardly and then inwardly so that at its extremities openings 144 are left between the lateral wall of the half ring and the member 143. Hence the movement of the oil entrained by the oil collar does not build up a high pressure on the oil scraper, as the oil may flow with considerable freedom into and out of the half ring through the apertures 144 at opposite extremities thereof.

In this embodiment the supporting disk 124 is provided adjacent the top and bottom thereof with a pair of interior arcuate channels 145 and 146. Channel 145 is connected through a passage 147 to an oil inlet pipe 148, and said channel is also provided with one or more passages 149 extending therefrom through the wall of the disk 124 to the chambers at opposite sides of the latter. Channel 146 communicates through a passage 150 with an oil outlet pipe 151, and similarly it has one or more passages 152 leading through the wall of the disk 124 to the chambers at opposite sides of said disk. In the lower part of the bearing housing the disk 124 constitutes a partition which divides the oil well into two chambers 153 and 154 as is apparent from Fig. 5, and to equalize the pressure between said two chambers and prevent oil rising in one of them materially higher than in the other, said chambers are connected by one or more equalizing passages 155 which as shown in Fig. 6 may be formed in projections on the wall of the bearing housing. The chambers at the two sides of the disk 124 at the inner sides of the thrust collars are provided with passages 156 leading to the equalizing channels 155 and which may be formed in any suitable way on or in the wall of the housing or otherwise, said passages 156 opening into said chambers somewhat below the level of the oil therein as illustrated in Fig. 5.

As shown in this embodiment, each thrust collar is also provided adjacent the top thereof with an oil scraper 157, here shown as a member channel-shaped in cross section so as to embrace the peripheral edges of the thrust collar and be thereby located thereon. Each oil scraper has a transverse member 158 which lies diagonally with respect to the periphery of the collar so as to deflect the oil collected thereby into the chamber between the thrust collars, and each oil scraper also has depending inner and outer edges which also remove the oil from the peripheral edges of the collar and likewise deflect it inwardly toward the central chamber. Owing to the copious flow of oil into the chambers between the thrust collars as thus provided, the oil will tend to maintain a higher level in said chambers than in the chambers at the rear faces of said collars, but owing to the existing communication between said chambers oil may flow therebetween and prevent too great a lowering of the oil level in the chambers at the rears of the thrust collars. To prevent escape of oil from the bearing housing an oil retaining ring 159 is provided at one or both extremities thereof to provide rubbing contact with the periphery of the shaft, said oil retaining ring also having an outer channel 160 which may have a passage 161 for returning the oil to the oil well as in embodiments heretofore described. The seal ring may be made in halves and held in position by a resilient ring embracing or surrounding the same as shown.

The embodiment of Figs. 5 and 6 is provided with both pressure lubrication and automatic self-lubrication so that either or both may be employed as preferred, but such double provision has special value inasmuch as it provides for an adequate self-lubrication of the bearing members in the event that the pressure lubrication is discontinued for any reason. If both are in service, pressure oil flows through the pipe 148 and passage 147 into the channel 145 whence it is delivered through the passages 149 into the chambers between the active faces of the thrust collar and in the upper portions thereof so that the radial bearing elements as well as the thrust bearing elements are flooded with oil. The oil flows downwardly into the well at the bottom of the housing whence it may flow out through the passages 152 into the channel 146, and thence through passage 150 to the outflow pipe 151. The pressure and level of the oil in the chambers 153 and 154 are equalized through the channels 155. Oil entrained by the rear or inactive faces of the thrust collars may flow in and out of the half rings 137 through the passages 144, the apertures 141 also providing for an inflow of oil if the pumping tendency of the collars is to unduly lower the level of the oil within the channel-shaped half rings. The rear or inactive faces of the thrust collars are prevented from carrying large quantities of oil to the upper side of the bearing by means of the oil scrapers 142, but oil carried upwardly by the peripheral surfaces of the thrust collars and by the edges adjacent thereto is removed by the oil scrapers 157 and deflected inwardly to the chambers between the active faces of the thrust collars whereby even in the absence of inflow of oil through the passage 149 a copious supply of oil is furnished to the chambers in the upper portion of the bearing. If both the pressure and automatic oiling means are active there is an intimate intermingling of hot and cool oil throughout the bearing chambers because of the various ways in which the oil circulates through the several chambers, and hence local overheating of the oil is prevented.

It will be perceived that the oil scraper 142 cooperating with the rear face of each thrust collar may be readily assembled with its associated half ring and rotated into its operating position on the periphery of the thrust collar when the upper half of the bearing housing is open. Thus the oil scraper is readily accessible for inspection or repair. Figs. 11 and 12 show an alternative construction which may be employed and wherein the oil scraper 164 is not mounted on the half ring 137 but is supported by a chordally extending strip 166 attached at its opposite extremities 167 (Fig. 12) by screws 168. This construction is readily accessible when as illustrated the housing 169 is provided with an opening 170 in its end wall, as for the introduction into the oil well of a cooling coil (not shown).

Figure 8:
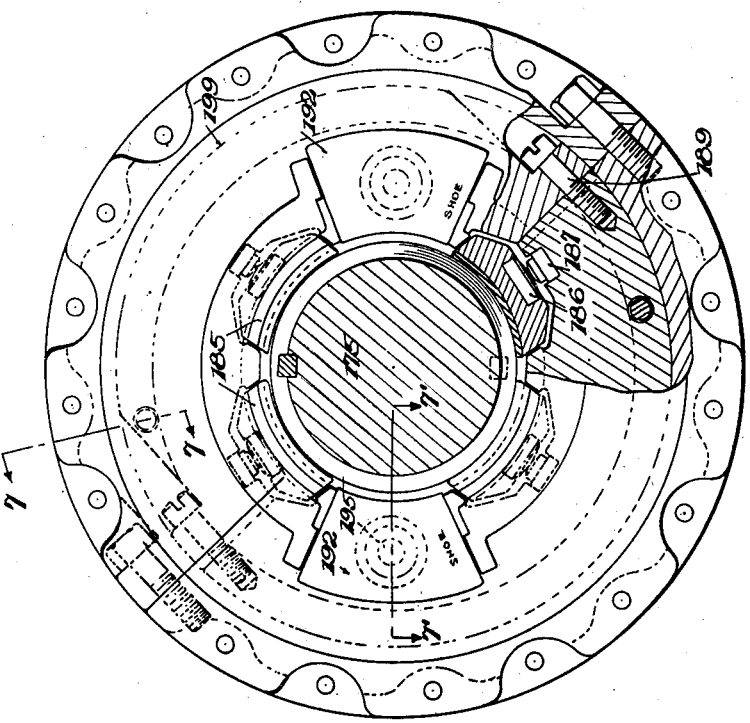
Fig. 8 is partly an end elevation and partly a section on the line 8—8 of Fig. 7.

The embodiment of Figs. 7 and 8 illustrates the use of circumferentially tiltable bearing shoes in the radial bearing. In the form shown the shaft 175 has a pair of collars 176 and 177, here shown as keyed to the shaft and spaced by a bearing sleeve 178. The housing 179 may be of the general form heretofore illustrated and described in conjunction with the embodiment of Figs. 1 and 2, including the intermediate cover portion 180 of substantially 180° extent and of a width substantially equal to the space between the inner faces of the two thrust collars. As here shown the bearing housing is of the flange type and is designed to be secured to a machine frame 181 and comprises an inner annular portion and an outwardly projecting lower semicircular portion 182 corresponding to the cover portion 180. In this embodiment the outer cover member 183 extends for 360° and is suitably secured to the main portion of the housing as by bolts or screws 184. Hence this cover portion cannot be removed except lengthwise of the shaft, as when the flywheel is removed.

Cooperating with the periphery of the bearing sleeve 178 is a plurality, here shown as four bearing shoes 185, two at the top of the shaft and two at the bottom of the shaft. As shown each of said shoes has a spherically faced insert 186 which has pivotal engagement with a hardened insert 187 carried by the split supporting disk 188, the latter being shown as split on a plane making approximately 45° to the horizontal as heretofore explained with the parts suitably secured together as by screws 189, and if desired the points for the housing cap 180 may be in the same plane as illustrated. Disk 188 is shaped to provide recesses 190 in which the shoes are mounted with freedom for tilting both axially and circumferentially of the shaft, so that said shoes may tilt to form wedge-shaped oil films and also to have proper aligning movement with the bearing surface of the sleeve on the shaft.

As in the embodiments previously described the supporting disk 188 carries two pairs of shoes 191 and 192 each pair cooperating with one of the inner faces of the thrust collars and being so disposed on opposite sides of the shaft as to be substantially symmetrical with respect to a horizontal plane containing the axis of the shaft. Said shoes may be of any suitable construction being illustrated as provided with blocks 193 received in recesses in the rear thereof and having spherical surfaces 194 for engagement with hardened plugs 195 here shown as threaded into apertures in the disk 188 and projecting at opposite faces thereof so as to afford at the opposite ends thereof a bearing engagement for the spherical surfaces at the rears of the respective shoes 191 and 192. Supporting disk 188 is also mounted to balance the pressure on the active pair of shoes as in embodiments heretofore described, and to this end it carries adjacent the top and bottom thereof threaded plugs 196 designed to make engagement at the opposite extremities thereof with pairs of spherically faced pivot blocks 197 carried by inwardly projecting lugs 198 on the bearing housing. Thereby a substantially vertical pivotal axis, extending at right angles to the line joining the pivotal centers of each pair of bearing shoes, is provided for the supporting disk 188 so that it may function as an equalizing support. Said disk 188 may be centered by engagement with the periphery of the housing, but preferably, in order to provide adjustment of the radial bearing shoes with respect to the bearing surface of the sleeve 178 a pair of jack screws project inwardly through the peripheral wall of the housing into engagement with the periphery of each half of the disk 188 so that the latter may be adjusted radially (see Fig. 10). To adjust the clearance or end play in an axial direction shims may be interposed between the blocks 193 and the body of the shoes and between the blocks 197 and the housing, or the plugs 195 and 196 may be subdivided midway of their lengths and oppositely threaded so that they may be correspondingly threaded into and out of their apertures, or the opposite ends of each plug shown may be machined so as to provide corresponding elevations of different degrees of axial projection at the opposite ends thereof so that by rotating the plug different but correspondingly projecting portions of the end surfaces of each plug may be brought into engagement with the spherical surfaces on the adjacent blocks to thereby vary the axial distance between said spherical surfaces. As in the earlier described embodiments oil may be introduced through the inlet passage 199 and withdrawn through any suitable outlet passage so that the bearing chambers will be copiously supplied with oil. Also as in earlier described embodiments oil retaining ring 201 is secured at one or both extremities of the housing and provides rubbing contact with the shaft or a sleeve thereon at 202, said ring also having an oil collecting channel 203 which may return the oil to the oil well or lead it through a suitable passage 204 to any suitable sump exteriorly of the housing.

The embodiment of Fig. 9 also employs tiltably mounted radial bearing shoes, although if preferred bearing shells may be used as in Figs. 1 to 6. This embodiment enables the use of a larger number of thrust bearing shoes than in the earlier embodiments described. As here shown the housing 207 is of the general type shown in Figs. 1 and 2 and has a cover 208 for access to the bearing element carried by a combined support and equalizing disk 209. The thrust collars 210 and 211 have thrust engagement respectively with bearing shoes 212 and 213 of any suitable construction. Each shoe is shown as provided at its rear face with a spherically faced pivot block 214 for engagement with a hardened insert 215 carried by said supporting and equalizing disk 209. In this embodiment said supporting and equalizing disk is split in an axial direction, although this is not essential as axial adjustment may be provided by shims as heretofore described, but in any event it is split in a circumferential direction. As shown it is composed of four generally semicircular parts, and in this event the axially subdivided sections have interlocking engagement by reason of apertures 216 formed on one section and axial projections 217 formed on the opposed section, the latter carrying the hardened inserts 215 for engagement with the shoes setting in the recesses 218 so formed in the section first referred to. The projections and apertures alternate in each ring section so that alternate shoe supports 215 face in opposite directions, and therefore the shoes carried by the supporting and equalizing disk alternately face in opposite directions, and are in staggered relation with respect to each other around the periphery of said disk. Hence the disk may carry four or any suitable larger even number of shoes so as to utilize substantially the entire thrust bearing surfaces of the collars if desired. To provide for the equalization of pressure on the respective sets of bearing shoes the outer peripheral faces 219 of said disk 209 at both axial faces thereof engage with the faces 220 of rings positioned between the peripheries of the thrust collars and the inner face of the housing and having rear spherical surfaces 221 seated on correspondingly shaped surfaces 222 provided on the bearing housing. Thus the thrust pressure for either direction is transmitted from the shoes to the supporting disk 209 and from the latter to a spherically seated ring which distributes the pressure with substantial uniformity over the several active bearing shoes in a manner well understood in the art. To provide for axial adjustment of the sections of the supporting disk shims 223 may be interposed between the subdivisions thereof and said subdivisions secured together as by screws 224. At the inner periphery of the said supporting disk are provided a plurality of circumferentially extending recesses in each of which is pivotally mounted a radial bearing shoe 225 which may be of the construction shown in Figs. 7 and 8. Any suitable number of radial bearing shoes may be used, and as in the embodiment of Figs. 7 and 8 said radial bearing shoes may tilt axially to make proper aligning engagement with the bearing surface of the shaft or a sleeve thereon and tilt circumferentially in order to provide wedge-shaped oil films between said bearing surfaces. Otherwise the construction may be substantially the same as heretofore described in conjunction with the embodiments of Figs. 7 and 8. In this embodiment, however, two jack screws for radially adjusting each quarter section of the supporting and equalizing disk should be associated with each of said sections.

The embodiment of Fig. 10 illustrates the use of spherical bearing surfaces in a bearing housing of the type shown in Figs. 1 and 2. In this embodiment the two thrust collars 230 and 231 have inwardly directed spherical bearing surfaces 232 and 233 respectively. Cooperating with said spherical bearing surfaces are shoes 234 of any suitable construction having spherical bearing faces, said shoes being shown as provided with spherically faced pivot blocks 235 for engagement with hardened inserts 236 carried by the supporting and equalizing disk 237. Said disk is split diametrically as in earlier embodiments described, and is provided at its opposite sides with staggered recesses 238 in which said shoes are mounted for universal pivotal movement. The halves of the supporting and equalizing disk 237, as in embodiments previously described, may be centered by pairs of jack screws 238 projecting through the periphery of the housing and engaging hardened inserts 239 carried by said disk. In this embodiment the cooperating spherical bearing surfaces act both as thrust and radial bearing surfaces, and hence separate sets of thrust and radial bearing shoes are unnecessary. Otherwise the construction shown in Fig. 10 is or may be substantially the same as heretofore described in conjunction with earlier embodiments.

In the embodiments so far described the compact thrust and radial bearing has been of the type employing a pair of thrust collars with the thrust and radial bearing elements interposed between said two thrust collars. However, within the broader aspects of the present invention, a single thrust collar may be used with the thrust bearing elements cooperating with opposed faces of said collar. This has the disadvantage that two sets of radial bearing elements are required, one at each face of the thrust collar. Fig. 13 is a fragmentary section of one side of a combined thrust and radial bearing of the type just referred to wherein the thrust collar 240 has cooperating therewith any suitable number of bearing shoes 241 provided with spherical rear faces 242 mounted on hardened inserts 243 carried by a spherically faced ring 244 cooperating with a spherical seat 245 suitably provided on the bearing housing. The ring 244, which may be made in halves as shown, has a large central bore and mounted therein concentrically therewith but preferably in staggered relation to the shoes 241 is a suitable number of radial bearing shoes or radial bearing shell sections 246 mounted to tilt on the ring 244 so as to provide for self-alignment of said radial bearing members axially of the shaft. It is to be understood that this construction may be duplicated at the opposite face of the thrust collar. Otherwise the construction used may be the same as that illustrated in connection with other embodiments above referred to.

Fig. 14 is a corresponding view of an alternative construction that may be employed and wherein the thrust collar 250 has cooperating with one or both faces thereof any suitable number of bearing shoes 251 provided with spherically faced rear surfaces 252 mounted on hardened plugs 253 carried by a cage 254, said plugs at their opposite ends having face engagement with an equalizing ring 255 having a spherical surface of contact with a correspondingly shaped surface provided on the bearing housing. As shown at the right-hand face of the thrust collar the radial bearing shoes 257 have spherically faced rear surfaces 258 which engage pins 259 carried by the cage and projecting through the outer periphery of the cage into spherical surfaced engagement with peripheral blocks 260 to which they may be secured as by screws 261. As illustrated the outer ends of the pins 259 are preferably seated in recesses in the blocks 260, and the outer ends of the pins 259 and the recesses are preferably squared or otherwise shaped to prevent relative rotation. The radial and thrust bearing elements are alternated around the circumference of the bearing so that there may be the same number of thrust bearing elements and radial bearing elements at each side of the thrust collar, six of each for example. Otherwise the construction of the bearing may be substantially the same as that discussed in conjunction with earlier embodiments.

Fig. 15 illustrates an embodiment in which the alternating thrust and radial shoes may be employed in conjunction with a spherically faced equalizing disk wholly disposed between the active faces of a pair of thrust collars. As here shown, the combined supporting and equalizing disk 265 is split circumferentially as heretofore described and also subdivided in the direction of its axis so that it is composed of four semicircular sections. Hence said disk may be adjusted as to its axial dimension by the interposition of shims at 266 and the axial sections secured together as by screws 267. 268 indicates the bolts or screws for securing together the sections at the circumferential division. The periphery of said disk 266 is provided with spherical surfaces 269 which make contact with correspondingly shaped surfaces 270 suitably provided on the bearing housing. Hence for either direction of thrust the disk 265 acts as a spherically faced equalizing ring. Said disk 265 is provided in alternation with central recesses and lateral recesses, the former to receive radial bearing shoes 271 and the latter to receive opposed thrust bearing shoes 272. Here again any suitable number of thrust and radial bearing shoes may be used in alternation throughout the entire circumference of the bearing. The bearing shoes and the supports therefor may be of any suitable construction such as heretofore described. Otherwise the bearing may be of the construction heretofore illustrated and described, the housing being shown as of the type shown in Figs. 1 and 2.

Fig. 16 illustrates an alternative form of supporting and equalizing disk that may be used in conjunction with various embodiments heretofore described. Whereas the supporting and equalizing disks illustrated in conjunction with the earlier described embodiments have been subdivided circumferentially into two sections each of which is of approximately 180° extent, disk 275 as shown in Fig. 16 may be of substantially U-shaped formation so as to provide a gap at least as large as the diameter of the shaft, whereby the disk may be passed over the shaft at said gap and then rotated into operative position. Said gap may then be filled by a filler piece 276, preferably having a dove-tailed engagement with the extremities of the main section 275, and suitably secured thereto as by bolts or screws 277 passed through flanges on the filler piece and into the body of the main section. This embodiment illustrates in dot and dash line four shoes 278 of any suitable construction mounted around the periphery of the thrust collar in equally spaced relation and having pivotal mounting on the main section 275 of the combined supporting and equalizing disk, and four radial shoes 279 of any suitable construction mounted in recesses in said disk.

It will therefore be perceived that by the present invention a very compact arrangement of thrust and radial bearing elements has been provided whereby the combined thrust and radial bearing may be mounted within a relatively narrow space lengthwise of the shaft, the same for example occupying no more space than has heretofore been utilized by ball and roller bearings. At the same time the construction provides ready radial accessibility to all parts of the bearing for inspection and replacement or repair, and the bearing also is readily accessible axially if it is desired to dismantle the bearing lengthwise of the shaft, as when the flywheel has been removed. The various embodiments of the invention provide pivotal mountings for the thrust bearing elements so that they may tilt universally to establish proper bearing films between the bearing surfaces of said bearing elements and the thrust collars, and at the same time the support for said thrust bearing elements is such as to substantially equalize or balance the pressure on said elements. Furthermore, the radial bearing elements are so mounted as to provide self-alignment so that they may make proper bearing engagement with the shaft, or a sleeve mounted thereon, in the direction of the axis of the shaft, said radial bearing elements being also free to assume the proper position for the maintenance of proper bearing films between the radial bearing surfaces. The radial bearing elements are mounted concentrically within the thrust bearing elements through use of a common supporting disk for both the thrust and radial bearing elements and hence space is conserved without interfering with the independent and appropriate movement of the respective thrust and radial bearing elements to establish proper oil films and maintain proper alignment or relationship between the coacting bearing surfaces.

Provision has also been made for the copious lubrication of both the thrust and radial bearing elements, and this provision for lubrication may include either or both pressure and automatic or self-lubrication. The construction readily adapts itself to the use of any suitable number and any suitable character of thrust and radial bearing elements so as to provide the requisite area of bearing surface within the confined limits available. Thus while tiltable thrust bearing shoes have been shown and described, this is not essential within the broader aspects of the invention. At the same time the bearing structure is relatively simple in character, easy to manufacture and install, capable of ready standardization, and highly efficient in operation.

While the embodiments of the invention illustrated on the drawings have been described with considerable particularity, it is to be expressly understood that the invention is not to be restricted thereto as the same are to be taken as exemplary of the invention inasmuch as the invention may take a variety of mechanical expressions some of which will now readily suggest themselves to those skilled in the art. While provisions for cooling the oil have not been illustrated it will be understood that any suitable means, either interiorly or exteriorly of the bearing housing, may be provided for this purpose. Certain features may be used without other features and changes may be made in the details of construction, arrangement, proportion, size, etc., without departing from the spirit of this invention. Reference is therefore to be had to the appended claims for a definition of the invention.

What is claimed is:

1. In a compact combined thrust and radial bearing, in combination with a shaft provided with a pair of axially spaced thrust collars having opposed parallel faces providing an annular space therebetween, a housing therefor provided with a cover intermediate its length for access to and in radial alignment with the space between the inner faces of said thrust collars and extending circumferentially for approximately 180°, and a combined thrust and radial bearing of the surface type disposed in said annular space and composed of elements all of which are removable radially through the arcuate space defined by said cover.

2. In a compact combined thrust and radial bearing, in combination with a shaft provided with a pair of axially spaced thrust collars, a housing therefor provided with a cover intermediate its length for access to and in radial alignment with the space between the inner faces of said thrust collars and extending circumferentially for approximately 180°, and a combined thrust and radial bearing mounted in the space between the inner faces of said thrust collars, said radial bearing comprising radial bearing members cooperating with a peripheral bearing surface carried by said shaft between said thrust collars and said thrust bearing comprising thrust bearing members cooperating with the inner faces of said thrust collars, said thrust and radial bearing members being removable radially when said cover is removed.

3. In a compact combined thrust and radial bearing, in combination with a shaft provided with a pair of axially spaced thrust collars, a housing therefor provided with a cover intermediate its length for access to and in radial alignment with the space between the inner faces of said thrust collars and extending circumferentially for approximately 180°, and a combined thrust and radial bearing mounted in the space between the inner faces of said thrust collars, said combined bearing including a split supporting disk interposed between said collars, one or more radial bearing elements cooperating with a peripheral bearing surface carried by said shaft and mounted at the inner periphery of said disk and a plurality of thrust bearing elements mounted at the faces of said disk and cooperating with the faces of said thrust collars, said supporting disk and said radial and thrust bearing elements being radially removable when said cover is removed.

4. In a compact combined thrust and radial bearing, in combination with a shaft provided with a pair of axially spaced thrust collars, a housing therefor provided with a cover intermediate its length for acccess to and in radial alignment with the space between the inner faces of said thrust collars and extending circumferentially for approximately 180°, and a combined thrust and radial bearing mounted in the space between said thrust collars, said combined bearing including thrust bearing elements cooperating with the faces of said thrust collars, a split supporting disk on which said thrust bearing elements are mounted, means supporting said disk whereby it substantially equalizes the pressure on the active thrust bearing elements, and radial bearing elements mounted on said disk and cooperating with a peripheral bearing surface carried by said shaft, said disk and said thrust and radial bearing elements being removable radially when said cover is removed.

5. In a compact combined thrust and radial bearing, in combination with a shaft provided with a pair of axially spaced thrust collars, a housing therefor provided with a cover intermediate itse length for access to and in radial alignment with the space between the inner faces of said thrust collars and extending circumferentially for approximately 180°, and a combined thrust and radial bearing mounted in the space between said collars, said combined bearing including thrust bearing elements cooperating with the faces of said collars, a split supporting disk on which said thrust bearing elements are mounted, and radial bearing elements mounted at the inner periphery of said disk to tilt axially of the shaft and cooperating with a peripheral bearing surface carried by said shaft, said disk and said thrust and radial bearing elements being removable radially when said cover is removed.

6. In a compact combined thrust and radial bearing, in combination with a shaft provided with a pair of axially spaced thrust collars, a housing therefor provided with a cover intermediate its length for access to and in radial alignment with the space between the inner faces of said thrust collars and extending circumferentially for approximately 180°, and a combined thrust and radial bearing mounted in the space between said collars, said combined bearing including a pair of bearing shoes cooperating with each inner face of said collars and mounted on opposite sides of said shaft, a split supporting disk on which said thrust bearing shoes are pivotally mounted, means supporting said disk whereby it may tilt transversely on an axis substantially at right angles to the line joining the pivotal centers of each pair of shoes, and radial bearing elements mounted on said disk circumferentially between said thrust bearing shoes and cooperating with a peripheral bearing surface carried by said shaft, said disk, said shoes and said radial bearing elements being removable radially when said cover is removed.

7. In a compact combined thrust and radial bearing, in combination with a shaft provided with a pair of axially spaced thrust collars, a housing therefor provided with a cover intermediate its length for access to and in radial alignment with the space between the inner faces of said thrust collars and extending circumferentially for approximately 180°, and a combined thrust and radial bearing mounted in a space between said thrust collars, said combined bearing including a plurality of thrust bearing elements cooperating with each inner face of said thrust collars, a split supporting disk on which said thrust bearing elements are mounted, means comprising cooperating spherical surfaces whereby said disk also functions as an equalizing support for said thrust bearing elements, and radial bearing elements mounted on said disk and cooperating with a peripheral bearing surface carried by said shaft, said disk and said thrust and radial bearing elements being removable radially when said cover is removed.

8. In a compact combined thrust and radial bearing, in combination with a shaft provided with a pair of axially spaced thrust collars, a housing therefor provided with a cover intermediate its length for access to and in radial alignment with the space between the inner faces of said thrust collars and extending circumferentially for approximately 180°, and a combined thrust and radial bearing mounted in the space between said thrust collars, said combined bearing including thrust bearing elements cooperating with the inner faces of said thrust collars, a circumferentially split supporting disk having its halves divided axially of the shaft to provide for axial adjustment of said thrust bearing elements with respect to the bearing surfaces of said collars, and radial bearing elements mounted on said disk and cooperating with a peripheral bearing surface carried by said shaft, said disk sections and said thrust and radial bearing elements being removable radially when said cover is removed.

9. In a compact combined thrust and radial bearing, in combination with a shaft and a thrust collar mounted thereon, thrust bearing elements cooperating with a face of said collar, a supporting disk on which said thrust bearing elements are tiltably mounted, means supporting said disk, and radial bearing elements cooperating with a peripheral bearing surface carried by said shaft and mounted on the inner periphery of said disk to move relatively thereto.

10. In a compact combined thrust and radial bearing, in combination with a shaft and a thrust collar mounted thereon, thrust bearing elements cooperating with a face of said collar, a supporting disk on which said thrust bearing elements are tiltably mounted, means mounting said disk whereby it substantially equalizes the pressure on said thrust bearing elements, and radial bearing elements cooperating with a peripheral bearing surface carried by said shaft and mounted at the inner periphery of said disk to move relatively thereto.

11. In a compact combined thrust and radial bearing, in combination with a shaft and a thrust collar mounted thereon, thrust bearing elements cooperating with a face of said collar, a supporting disk on which said thrust bearing elements are tiltably mounted, and means supporting said disk, radial bearing elements cooperating with a peripheral bearing surface carried by said shaft, said radial bearing elements being mounted on said disk in staggered relation circumferentially of the shaft with respect to said thrust bearing elements.

12. In a compact combined thrust and radial bearing, in combination with a shaft and a thrust collar mounted thereon, thrust bearing elements cooperating with a face of said collar, a supporting disk on which said thrust bearing elements are tiltably mounted, means mounting said disk whereby said disk substantially equalizes the pressure on said thrust bearing elements, and radial bearing elements cooperating with a peripheral bearing surface carried by said shaft and in staggered relation circumferentially of the shaft with respect to said thrust bearing elements, said radial bearing elements being mounted at the inner periphery of said disk.

13. In a compact combined thrust and radial bearing, in combination with a shaft and a pair of adjacent thrust collars mounted thereon, a combined thrust and radial bearing mounted in the space between said thrust collars, said combined thrust and radial bearing including thrust bearing elements cooperating with the inner faces of said thrust collars, a split supporting disk interposed between the thrust bearing elements cooperating with the respective thrust collars and on which said thrust bearing elements are mounted, and radial bearing elements mounted at the inner periphery of said disk and cooperating with a peripheral bearing surface carried by said shaft.

14. In a compact combined thrust and radial bearing, in combination with a shaft and a pair of adjacent thrust collars mounted thereon, a combined thrust and radial bearing mounted in the space between said thrust collars, said combined thrust and radial bearing including thrust bearing elements cooperating with the inner faces of said thrust collars, a split supporting disk interposed between the thrust bearing elements cooperating with the respective thrust collars and on which said thrust bearing elements are mounted, means mounting said disk whereby it substantially equalizes the pressure on the thrust bearing elements cooperating with each thrust collar, and radial bearing elements mounted at the inner periphery of said disk and cooperating with a peripheral bearing surface carried by said shaft.

15. In a compact combined thrust and radial bearing, in combination with a shaft and a pair of adjacent thrust collars mounted thereon, a combined thrust and radial bearing mounted in the space between said thrust collars, said combined thrust and radial bearing including thrust bearing elements cooperating with the inner faces of said thrust collars, a split supporting disk interposed between the thrust bearing elements cooperating with the respective thrust collars and on which said thrust bearing elements are mounted, radial bearing elements cooperating with a peripheral bearing surface carried by said shaft and mounted at the inner periphery of said disk, and means mounting said radial bearing elements to tilt axially of the shaft.

16. In a compact combined thrust and radial bearing, in combination with a shaft and a pair of adjacent thrust collars mounted thereon, a combined thrust and radial bearing mounted in the space between said thrust collars, said combined thrust and radial bearing including thrust bearing elements cooperating with the inner faces of said thrust collars, a split supporting disk interposed between the thrust bearing elements cooperating with the respective thrust collars and on which said thrust bearing elements are pivotally mounted, means supporting said disk whereby it substantially equalizes the pressure on the thrust bearing elements cooperating with each thrust collar, and radial bearing elements tiltably mounted on the inner periphery of said disk and cooperating with a peripheral bearing surface carried by said shaft.

17. In a compact combined thrust and radial bearing, in combination with a shaft and a pair of adjacent thrust collars mounted thereon, a combined thrust and radial bearing mounted in the space between said thrust collars, said combined thrust and radial bearing including a pair of thrust bearing elements cooperating with each inner face of said thrust collars and disposed at opposite sides of the shaft, a split supporting disk interposed between the thrust elements cooperating with the respective thrust collars and on which said thrust bearing elements are pivotally mounted, means mounting said disk whereby it may tilt about an axis extending substantially at right angles to the line joining the pivotal centers of the shoes cooperating with each thrust collar, and radial bearing elements mounted at the inner periphery of said disk and cooperating with a peripheral bearing surface carried by said shaft.

18. In a compact combined thrust and radial bearing, in combination with a shaft and a pair of adjacent thrust collars mounted thereon, a combined thrust and radial bearing mounted in the space between said thrust collars, said combined thrust and radial bearing including a plurality of thrust bearing elements cooperating with the inner faces of said thrust collars, a split supporting disk interposed between the thrust bearing elements cooperating with the respective thrust collars and on which said thrust bearing elements are mounted, means mounting said disk and comprising cooperating spherical surfaces whereby said disk substantially equalizes the pressure on the thrust bearing elements cooperating with each thrust collar, and radial bearing elements mounted at the inner periphery of said disk and cooperating with a peripheral bearing surface carried by said shaft.

19. In a compact combined thrust and radial bearing, in combination with a shaft and a pair of adjacent thrust collars mounted thereon, a combined thrust and radial bearing mounted in the space between said thrust collars, said combined thrust and radial bearing including thrust bearing elements cooperating with the inner faces of said thrust collars, a split supporting disk interposed between the thrust bearing elements cooperating with the respective thrust collars and on which said thrust bearing elements are mounted, means whereby the axial distance between the bearing faces of the thrust elements cooperating with the respective thrust collars may be adjusted, and radial bearing elements mounted at the inner periphery of said disk and cooperating with a peripheral bearing surface carried by said shaft.

20. In a compact combined thrust and radial bearing, in combination with a shaft and a pair of adjacent thrust collars mounted thereon, a combined thrust and radial bearing mounted in the space between said thrust collars, said combined thrust and radial bearing including thrust bearing elements cooperating with the inner faces of said thrust collars, a circumferentially split supporting disk interposed between the thrust bearing elements cooperating with the respective thrust collars and on which said thrust bearing elements are mounted, said disk being also subdivided in the direction of its axis whereby the axial thickness of said disk may be adjusted to vary the axial distance between the bearing faces of the thrust bearing elements disposed at opposite sides thereof, and radial bearing elements mounted at the inner periphery of said disk and cooperating with a peripheral bearing surface carried by said shaft.

21. In a compact combined thrust and radial bearing, in combination with a shaft and a pair of adjacent thrust collars mounted thereon, a combined thrust and radial bearing mounted in the space between said thrust collars, said combined thrust and radial bearing including a plurality of thrust bearing elements cooperating with the inner face of each of said thrust collars, a supporting means interposed between the thrust bearing elements cooperating with the respective thrust collars and on which said thrust bearing elements are mounted, and radial bearing elements mounted at the inner periphery of said supporting means and cooperating with a peripheral bearing surface carried by said shaft, said thrust and radial bearing elements being staggered circumferentially around the shaft.

22. In a compact combined thrust and radial bearing, in combination with a shaft and a pair of adjacent thrust collars mounted thereon, a combined thrust and radial bearing mounted in the space between said thrust collars, said combined thrust and radial bearing including a plurality of thrust bearing elements cooperating with the inner face of each of said thrust collars, supporting means interposed between the thrust bearing elements cooperating with the respective thrust collars and on which said thrust bearing elements are mounted, radial bearing elements mounted at the inner periphery of said supporting means and cooperating with a peripheral bearing surface carried by said shaft, means for circulating oil into and through the chambers between said thrust collars, and means cooperating with the peripheries of said thrust collars for removing oil therefrom and flooding said bearing surfaces if said first named oil circulating means is not in operation.

23. In a compact combined thrust and radial bearing, in combination with a shaft and a pair of adjacent thrust collars mounted thereon, a combined thrust and radial bearing mounted in the space between said thrust collars, said combined thrust and radial bearing including a plurality of thrust bearing elements cooperating with the inner face of each of said thrust collars, supporting means interposed between the thrust bearing elements cooperating with the respective thrust collars and on which said thrust bearing elements are mounted, radial bearing elements mounted at the inner periphery of said supporting means and cooperating with a peripheral bearing surface carried by said shaft, and an oil scraper cooperating with the periphery of each thrust collar and adapted to collect oil therefrom and deliver it into the space between said thrust collars.

24. In a compact combined thrust and radial bearing, in combination with a shaft and a pair of adjacent thrust collars mounted thereon, a combined thrust and radial bearing mounted in the space between said thrust collars, said combined thrust and radial bearing including a plurality of thrust bearing elements cooperating with the inner face of each of said thrust collars, supporting means interposed between the thrust bearing elements cooperating with the respective thrust collars and on which said thrust bearing elements are mounted, radial bearing elements mounted at the inner periphery of said supporting means and cooperating with a peripheral bearing surface carried by said shaft, an oil scraper cooperating with the periphery of each thrust collar and adapted to collect oil therefrom and deliver it into the space between said thrust collars, and means for removing oil from the inactive faces of said thrust collars.

25. In a compact combined thrust and radial bearing, in combination with a shaft and a pair of adjacent thrust collars mounted thereon, a combined thrust and radial bearing mounted in the space between said thrust collars, said combined thrust and radial bearing including a plurality of thrust bearing elements cooperating with the inner face of each of said thrust collars, supporting means interposed between the thrust bearing elements cooperating with the respective thrust collars and on which said thrust bearing elements are mounted, radial bearing elements mounted at the inner periphery of said supporting means and cooperating with a peripheral bearing surface carried by said shaft, an oil scraper cooperating with the periphery of each thrust collar and adapted to collect oil therefrom and deliver it into the space between said thrust collars, and means for equalizing the pressure on the oil in the chambers adjacent the rear faces of said thrust collars.

26. In a compact combined thrust and radial bearing, in combination with a shaft and a pair of adjacent thrust collars mounted thereon, a combined thrust and radial bearing mounted in the space between said thrust collars, said combined thrust and radial bearing including a plurality of thrust bearing elements cooperating with the inner face of each of said thrust collars, supporting means interposed between the thrust bearing elements cooperating with the respective thrust collars and on which said thrust bearing elements are mounted, radial bearing elements mounted at the inner periphery of said supporting means and cooperating with a peripheral bearing surface carried by said shaft, an oil scraper cooperating with the periphery of each thrust collar and adapted to collect oil therefrom and deliver it into the space between said thrust collars, and means cooperating with the shaft at one or both ends of said bearing for preventing escape of oil along the shaft at the inactive side of a thrust collar.

27. In a compact combined thrust and radial bearing, in combination with a shaft and a pair of thrust collars mounted thereon, a housing surrounding said collars and including a cover radially aligned with the space between the inner faces of said thrust collars and extending circumferentially over a major portion of the upper portion of said housing, and a combined thrust and radial bearing mounted in the space between said thrust collars and composed of elements radially removable from said space when said cover is removed, said combined thrust and radial bearing including thrust bearing elements cooperating with the inner faces of said thrust collars, a subdivided supporting means interposed between the thrust bearing elements cooperating with the respective thrust collars and on which said thrust bearing elements are mounted, said supporting means when subdivided being removable radially from said shaft, and radial bearing elements cooperating with a peripheral bearing surface carried by said shaft and mounted at the inner periphery of said supporting means.

28. In a compact combined thrust and radial bearing, in combination with a shaft and a pair of thrust collars mounted thereon, a housing surrounding said collars and including a cover radially aligned with the space between the inner faces of said thrust collars and extending circumferentially over a major portion of the upper portion of said housing, a combined thrust and radial bearing mounted in the space between said thrust collars and composed of elements radially removable from said space when said cover is removed, said combined thrust and radial bearing including thrust bearing elements cooperating with the inner face of each thrust collar, a subdivided supporting means interposed between the thrust bearing elements cooperating with the respective thrust collars and on which said thrust bearing elements are mounted, means including spherical surfaces of engagement for mounting said supporting means whereby said supporting means also acts as an equalizing member in substantially equalizing the pressure on the thrust bearing elements cooperating with each thrust collar, and radial bearing elements mounted at the inner periphery of said supporting means and cooperating with a peripheral bearing surface carried by said shaft.

29. In a compact combined thrust and radial bearing, in combination with a shaft and a pair of thrust collars mounted thereon, a housing surrounding said collars and including a cover radially aligned with the space between the inner faces of said thrust collars and extending circumferentially over a major portion of the upper portion of said housing, a combined thrust and radial bearing mounted in the space between said thrust collars and composed of elements radially removable from said space when said cover is removed, said combined thrust and radial bearing including a plurality of thrust bearing elements cooperating with the inner face of each thrust collar, supporting means interposed between the thrust bearing elements cooperating with the respective thrust collars and subdivisible circumferentially and axially of the shaft, said thrust bearing elements being tiltably mounted on said supporting means, and bearing elements mounted at the inner periphery of said supporting means and cooperating with a peripheral bearing surface carried by said shaft.

30. In a compact combined thrust and radial bearing, in combination with a shaft and a pair of thrust collars mounted thereon, a housing surrounding said collars and including a cover radially aligned with the space between the inner faces of said thrust collars and extending circumferentially over a major portion of the upper portion of said housing, a combined thrust and radial bearing mounted in the space between said thrust collars and composed of elements radially removable from said space when said cover is removed, said combined thrust and radial bearing including a plurality of thrust and radial bearing elements disposed in staggered relationship circumferentially around said shaft, and a subdivided supporting disk on which said bearing elements are pivotally mounted to tilt both axially and circumferentially of the shaft.

31. In a compact combined thrust and radial bearing, in combination with a shaft and a pair of thrust collars mounted thereon, a housing surrounding said collars and including a cover radially aligned with the space between the inner faces of said thrust collars and extending circumferentially over a major portion of the upper portion of said housing, a combined thrust and radial bearing mounted in the space between said thrust collars and composed of elements radially removable from said space when said cover is removed, said combined thrust and radial bearing including a plurality of thrust bearing elements cooperating with the inner faces of said thrust collars, a supporting means interposed between the thrust bearing elements cooperating with the respective thrust collars and on which said thrust bearing elements are mounted, said supporting means being subdivisable axially of the shaft whereby shims may be interposed between the subdivisions of said ring to adjust the axial distance between the thrust bearing elements cooperating with the respective thrust collars, and radial bearing elements mounted at the inner periphery of said supporting means and cooperating with a peripheral bearing surface carried by said shaft.

32. In a compact combined thrust and radial bearing, in combination with a shaft and a pair of thrust collars mounted thereon, a housing surrounding said collars and including a cover radially aligned with the space between the inner faces of said thrust collars and extending circumferentially over a major portion of the upper portion of said housing, a combined thrust and radial bearing mounted in the space between said thrust collars and composed of elements radially removable from said space when said cover is removed, said combined thrust and radial bearing including thrust bearing elements cooperating with the inner faces of said thrust collars, a supporting means interposed between the thrust bearing elements cooperating with the respective thrust collars, said thrust bearing elements being mounted on said supporting means and including means whereby the axial distance between the faces of the thrust bearing elements cooperating with the respective thrust collars may be adjusted, and radial bearing elements mounted at the inner periphery of said supporting means and cooperating with a peripheral bearing surface carried by said shaft.

33. In a compact combined thrust and radial bearing, in combination with a shaft and a pair of thrust collars mounted thereon, a housing surrounding said collars and including a cover radially aligned with the space between the inner faces of said thrust collars and extending circumferentially over a major portion of the upper portion of said housing, a combined thrust and radial bearing mounted in the space between said thrust collars and composed of elements radially removable from said space when said cover is removed, said combined thrust and radial bearing including thrust bearing elements cooperating with the inner faces of said thrust collars, supporting means interposed between the thrust bearing elements cooperating with the respective thrust collars and on which said thrust bearing elements are mounted, and a plurality of radial bearing shoes mounted at the inner periphery of said supporting means to tilt both circumferentially and axially of the bearing and cooperating with a peripheral bearing surface carried by said shaft.

34. In a compact combined thrust and radial bearing, in combination with a shaft and a pair of thrust collars mounted thereon, a housing surrounding said collars and including a cover radially aligned with the space between the inner faces of said thrust collars and extending circumferentially over a major portion of the upper portion of said housing, a combined thrust and radial bearing mounted in the space between said thrust collars and composed of elements radially removable from said space when said cover is removed, said combined thrust and radial bearing including a pair of thrust bearing elements cooperating with the inner face of each of said thrust collars and disposed on opposite sides of said shaft in substantially horizontal alignment, a supporting means interposed between the thrust bearing elements cooperating with the respective thrust collars and on which said thrust bearing elements are pivotally mounted, means for pivotally mounting said supporting means to tilt laterally about a substantially vertical axis, and radial bearing elements mounted at the inner periphery of said supporting means and cooperating with a peripheral bearing surface carried by said shaft.

35. In a compact combined thrust and radial bearing, in combination with a shaft, a pair of axially spaced thrust collars mounted thereon and a housing surrounding said thrust collars, thrust bearing elements cooperating with the inner faces of said thrust collars, a supporting means interposed between the thrust bearing elements cooperating with the respective thrust collars and on which said thrust bearing elements are tiltably mounted, means mounting said supporting means whereby it substantially equalizes the pressure on the thrust bearing elements, radial bearing elements mounted at the inner periphery of said supporting means to tilt axially of the shaft and cooperating with a peripheral bearing surface carried by said shaft, and means cooperating with the periphery of each thrust collar for collecting oil therefrom and directing it to the bearing surfaces of said elements in the space between said thrust collars.

36. In a compact combined thrust and radial bearing, in combination with a shaft, a pair of axially spaced thrust collars mounted thereon and a housing surrounding said thrust collars, thrust bearing elements cooperating with the inner faces of said thrust collars, a supporting means interposed between the thrust bearing elements cooperating with the respective thrust collars and on which said thrust bearing elements are tiltably mounted, means mounting said supporting means whereby it substantially equalizes the pressure on the thrust bearing elements, radial bearing elements mounted at the inner periphery of said supporting means to tilt axially of the shaft and cooperating with a peripheral bearing surface carried by said shaft, a half ring surrounding the lower periphery of each thrust collar, and an oil scraper cooperating with the inactive face of each thrust collar to minimize carriage of oil by said inactive face to the upper part of said bearing, said oil scraper being carried by said half ring and providing passages therebetween whereby oil entrained by said collar flows tangentially through the space between said collar and said half ring.

37. In a compact combined thrust and radial bearing, in combination with a shaft, a pair of axially spaced thrust collars mounted thereon and a housing surrounding said thrust collars, thrust bearing elements cooperating with the inner faces of said thrust collars, a supporting disk interposed between the thrust bearing elements cooperating with the respective thrust collars and on which said thrust bearing elements are tiltably mounted, means mounting said disk whereby it substantially equalizes the pressure on the thrust bearing elements, radial bearing elements mounted at the inner periphery of said disk to tilt axially of the shaft and cooperating with a peripheral bearing surface carried by said shaft, said disk being provided interiorly thereof with a pair of arcuate channels, oil inlet means communicating with one of said channels and oil outlet means communicating with the other of said channels, and passages in said ring communicating with said channels whereby oil may flow from and into said respective channels.

38. In a compact combined thrust and radial bearing, in combination with a shaft, a pair of axially spaced thrust collars mounted thereon and a housing surrounding said thrust collars, thrust bearing elements cooperating with the inner faces of said thrust collars, a supporting means interposed between the thrust bearing elements cooperating with the respective thrust collars and on which said thrust bearing elements are tiltably mounted, means mounting said supporting means whereby it substantially equalizes the pressure on the thrust bearing elements, radial bearing elements mounted at the inner periphery of said supporting means to tilt axially of the shaft and cooperating with a peripheral bearing surface carried by said shaft, means for introducing oil into the space between said thrust collars at the upper portion of said bearing whereby said bearing surfaces are flooded, means for withdrawing oil from said space, and means cooperating with said thrust collars to deflect oil carried thereby into said space whereby the bearing surfaces are copiously lubricated if said first named oil circulating means is not in operation.

39. In a compact combined thrust and radial bearing, in combination with a shaft, a pair of axially spaced thrust collars mounted thereon and a housing surrounding said thrust collars, thrust bearing elements cooperating with the inner faces of said thrust collars, a supporting means interposed between the thrust bearing elements cooperating with the respective thrust collars and on which said thrust bearing elements are tiltably mounted, means mounting said supporting means whereby it substantially equalizes the pressure on the thrust bearing elements, and radial bearing elements mounted at the inner periphery of said supporting means to tilt axially of the shaft and cooperating with a peripheral bearing surface carried by said shaft, said thrust and radial bearing elements being arranged concentrically within the space provided between the inner faces of said thrust collars.

40. In a compact combined thrust and radial bearing, in combination with a shaft, a pair of axially spaced thrust collars mounted thereon and a housing surrounding said thrust collars, thrust bearing elements cooperating with the inner faces of said thrust collars, a supporting means interposed between the thrust bearing elements cooperating with the respective thrust collars and on which said thrust bearing elements are tiltably mounted, means mounting said supporting means whereby it substantially equalizes the pressure on the thrust bearing elements, and radial bearing elements mounted at the inner periphery of said supporting means to tilt axially of the shaft and cooperating with a peripheral bearing suface carried by said shaft, said thrust and radial bearing elements being arranged in staggered relationship but relatively concentrically around the axis of said shaft and within the space defined by the inner faces of said thrust collars.

HARRY A. S. HOWARTH.